United States Patent Office 3,490,513
Patented Jan. 20, 1970

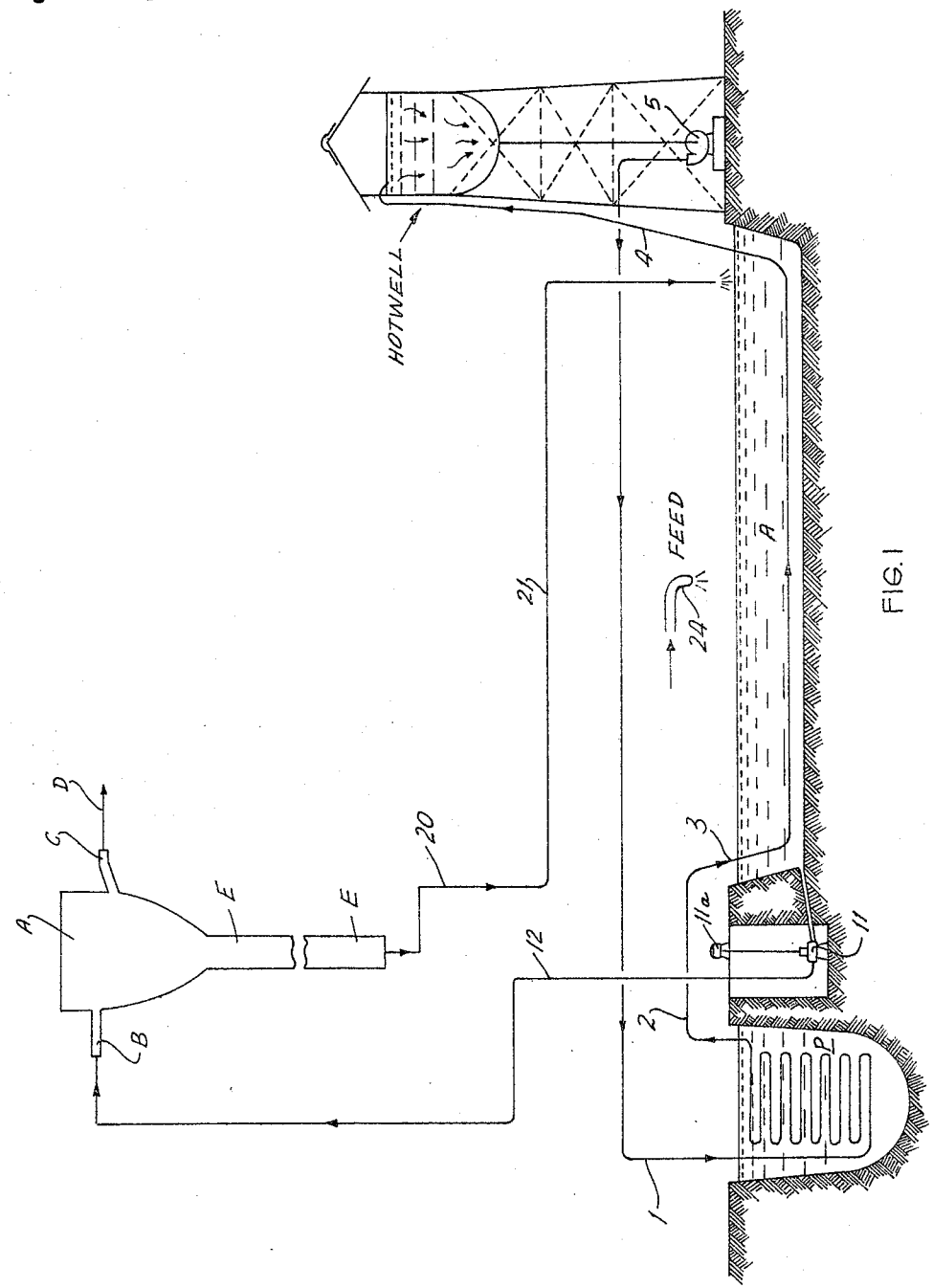

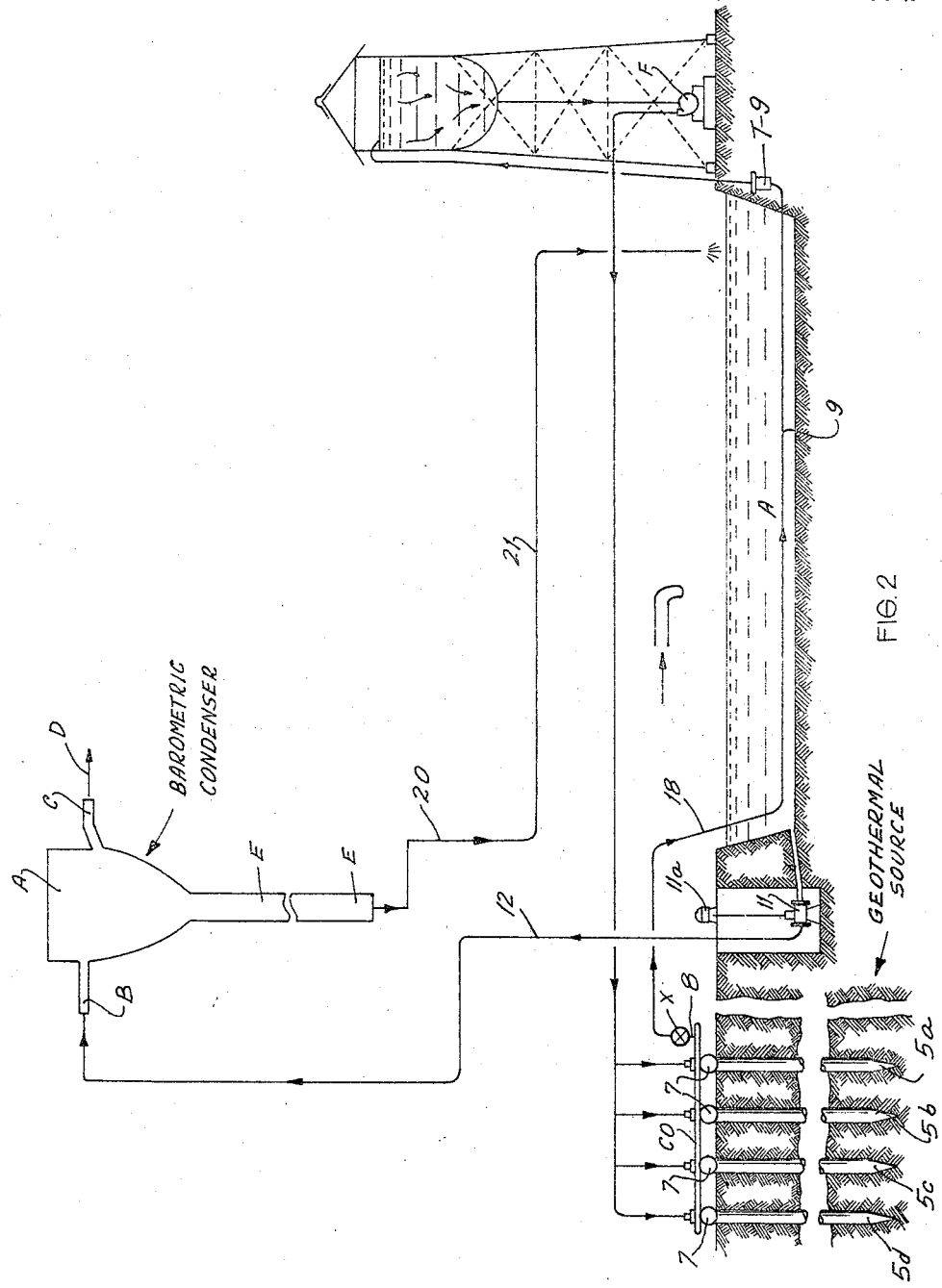

3,490,513
RECOVERY OF SALT
Juan T. Villanueva, 105 Apo St., Sta Mesa Heights,
Quezon City, Rizal, Philippines
Original application Nov. 4, 1964, Ser. No. 408,993, now Patent No. 3,363,664, dated Jan. 16, 1968. Divided and this application Jan. 9, 1968, Ser. No. 696,555
Claims priority, application Philippines, Feb. 25, 1964, 5,436
The portion of the term of the patent subsequent to Jan. 16, 1985, has been disclaimed
Int. Cl. B01d 3/10, 1/00
U.S. Cl. 159—2
5 Claims

ABSTRACT OF THE DISCLOSURE

Brine is confined in a brine concentration basin. The brine is heated by circulating therethrough in heat-exchanging coils immersed in the basin a non-evaporable liquid which has been heated by being passed into contact with heat emitted by a geothermal source. The heated brine is passed into a barometric condenser where the falling column of hot brine evaporates violently because of the partial vacuum formed within the tube of the condenser. The developing steam or water vapor is continuously exhausted from the condenser and the remaining brine is returned to the brine concentration basin. Repetition of this circulation through the barometric condenser will result eventually in removal of liquid from the brine concentration basin and in precipitation of the salt contents which were originally in solution in the basin.

---

The present invention is a division of my copending application, Ser. No. 408,993, filed on Nov. 4, 1964 under the title "Novel Scheme of Salt Manufacture," now U.S. Patent No. 3,363,664.

In some areas of the world, salt is available in form of natural deposits which can be easily mined. Most of the salt consumed in the world is, however, recovered through selective evaporation of sea water, either by utilizing the radiant heat energy of the sun or by artificial means through the application of heat by combustion of fuels. The most economical of the systems used in this connection is the utilization of heat radiated by the sun during dry seasons to evaporate sea water placed within evaporating basins, taking advantage of the tides of the sea in order to preclude excessive pumping operations. However, this process is absolutely dependent upon natural phenomena and climate. It is evident that in cases of snow or rain or at night when the sun is absent, salt recovery is impossible in this manner. Many attempts have therefore been made to recover salt from sea water, particularly using natural heat derived not necessarily from the benefits of sunlight, but from other natural sources such as from hot springs or fumaroles or sulfataras—i.e. volcanic manifestations of heat coming from the core of the earth. However, no economically feasible system based on this principle is known to me.

It is the purpose of the present application to provide a system for the economical manufacture of common salt (natrium chloride) from sea water, or of any other salt or product naturally available in solution, by taking advantage of the heat energy of fumaroles and analogous geothermal sources. To attain my objective I make use of the possibilities offered by barometric condensers for the precipitation of salts and/or similar solids in solution.

In accordance with one feature of my invention I provide a method of extracting a solid ingredient from a solution containing a liquid solvent and having the solid ingredient dissolved therein. I achieve my purposes by continuously circulating a heating fluid initially through a geothermal heating station for raising the temperature of such fluid. Subsequently the fluid is circulated into heat-exchanging relationship with a body of the solution for raising the temperature of such solution to a predetermined level. Heated solution is then removed from the body of solution and passed through an evaporation zone wherein partial evaporation is effected by subjecting the thus removed heated solution to a partial vacuum, whereby to vaporize a part of the thus heated solution and to cause precipitation of at least some of the solid ingredient and separation thereof from the remainder of the solution. The remainder of the solution is continuously returned to the body of solution.

The invention is illustrated in the appended drawing, wherein

FIG. 1 is a side elevation, partly in section, of a plant in accordance with my invention; and FIG. 2 is a view similar to FIG. 1, but of an alternative embodiment of my invention.

It should be understood that the illustrations are shown in simplified form so that they may serve as a guide in the design and construction of the actual plant.

The process is based upon two basic principles, namely "heat transfer" whereby heat is drawn from a natural source, such as a hot spring or the natural hot substrator of locations where a geothermal heat is manifested, and is subsequently transferred by means of heat exchanging devices to the sea water or brine stored in basins which latter are hereafter referred to as brine concentration basins; and "brine concentration and salt precipitation" whereby the hot sea water or brine deposited in the brine concentration basins is kept in circulation through barometric condensers in order to drive therefrom water vapor emitted as a result of the partial vacuum which develops in the barometric condensers when the falling column of hot solution therewithin evaporates violently. The continuous evaporation which thus takes place will eventually cause precipitation of all salts in solution so that, if a suitable filter or strainer is placed to collect the salt crystals thus formed before returning the remaining mother liquor to the brine concentration basins for further heating and subsequent recirculation through the barometric condenser for repetition of the process, an automatic means for the continuous extraction of salt is thus obtained which is practically independent from meteorological conditions, provided that it is duly sheltered from rain and/or snow.

Depending upon the natural heat source available, two possibilities exist for the recovery of geothermal heat. Referring specifically to FIG. 1 of the drawing, if the source of geothermal heat is a fumarole in form of a natural boiling pond P, coils 1, 2 of pipe or tube are suspended therein and a liquid which will not evaporate is circulated within the coils, the most economical liquid for this purpose being water of course. Similar coils 3, 4 of the same type are also suspended in the brine concentration basin A which is initially filled up with sea water eventually concentrated to brine because of continuous evaporation.

Closed circulation of water by the pump 5 through the coils 1, 2 immersed within the boiling pond P and through the coils 3, 4 submerged in the brine or sea water in the brine concentration basin A tends to transfer the heat from the boiling pond P to the basin A, thereby raising the temperature of the sea water or brine and making possible the effective evaporation of the latter when the same is subjected to the action of a barometric condenser.

With a boiling pond or water as source of heat the brine temperature would be theoretically limited to the temperature of the source, i.e. that of boiling water under atmospheric conditions at seal level, namely 212° F.

For practical purposes of salt production it is estimated that a temperature not less than 140° F. entering the condenser would be economically effective enough, although higher temperatures which ideally cannot go beyond 210° F. and which most likely and practically would be around 180° F., would in reality of course be highly desirable.

On the other hand it might be desired to extract steam from the site of the fumaroles or natural heat manifestations from the core of the earth as applicant has done, obtaining a pressure as high as 25 p.s.i.g. Of course, this requires driving of wells and sinking therein pipes within which the steam is to be generated to offer a source of live steam even of low pressure for heating the sea water or brine contained within the concentration basins.

FIG. 2 shows an installation for this purpose. Multiple pipes, all closed at their bottom ends and designated with reference numerals 5a, 5b, 5c and 5d, are driven with their closed bottom ends into the ground in the area showing manifestations of abundant natural heat. Preferably, the bottom ends are pointed for easy penetration. Each of the pipes 5a–5d has a second pipe coaxially arranged therewithin, through which water is fed under pressure by a boiler feed pump F installed at ground level below the elevated tank H.

The pipes 5a–5d are all connected at their upper ends to horizontal steam manifolds 7 which in turn communicate with a collector pipe C0 from where steam enters into the steam main 8 through a throttling valve X. Steam main 8 is connected via individual throttles or control valves to the heat exchanger coils 8, 9 which are immersed in the brine concentration basins A similar to those shown in FIG. 1.

The coils 8, 9 empty condensate from the steam into individual steam traps 9, the outlets of which are interconnected for the collection of the entire recoverable condensate for delivery into a hot well for economical recovery both of the soft water and of the residual heat content thereof.

The advantage of this arrangement lies in the assurance of high temperature of the brine, say in the order of 200° F. or even 210° F., which is to say a temperature approaching if not actually reaching the ideal boiling temperature of water under atmospheric conditions at sea level.

The decision whether to utilize this more complicated and expensive construction rather than the simpler arrangement shown in FIG. 1 will be dictated largely by considerations relating to the economy of recovery.

Irrespective of the process used, it will be understood that the increase of temperature of sea water or brine to a level much higher than atmospheric conditions brings about the increase of vapor tension in the liquid as compared to the partial vapor pressure exerted by the moisture in the atmosphere. An unbalance relative to the ambient atmosphere is realized by the heating with a resulting tendency to reestablish equilibrium with the atmosphere through the emission of excess water vapor in the hot sea water or brine, thereby bringing down its temperature until it theoretically reaches the dew point under the prevalent condition.

Taking advantage of this phenomenon heated sea water or brine is withdrawn from the brine concentration basin A by the pump 11 which is driven by an electric motor 11a. The pump 11 circulates the withdrawn sea water or brine into the pipe 12 from which it passes into the inlet B of a barometric condenser which is shown diagrammatically in FIGS. 1 and 2. The barometric condenser is well known in the art and is therefore not described in detail. It consists basically of the receptacle A and the vertical or substantially vertical tube E wherein the descent of liquid causes the condenser to act as a draft tube of a hydraulic power plant with consequent development of a partial vacuum within the tube E, which vacuum could be as high as possibly 26 inches of mercury. Thus, by supplying heated brine or sea water into the receptacle A, the falling column of hot solution within the condenser will evaporate violently because of the partial vacuum formed, and steam or water vapor will be emitted. This is continuously exhausted through the outlet C of the condenser in the direction of the arrow D by a vacuum pump or vapor exhauster of known construction. Some of the salt will already be precipitated and can be removed at the bottom of the tube E. The remaining mother liquor, which is now concentrated, will leave the bottom of the tube E and will be returned through the conduits 20, 21 into the brine concentration basin A.

From this it is clear that continuous circulation of the hot brine or sea water in this manner will eventually result in precipitation of the entire salt contents which are in solution in the brine concentration basin A.

What is novel and for what claims are made is mainly the grouping and/or combination of otherwise known equipment, apparatus or machinery, as well as the innovations, alternations, improvements, changes or modifications upon the latter or upon the functions and/or principles of their operations which have herein been proposed in order to make them capable of performing the tasks assigned to them for the purpose of utilizing geothermal heat energy available in fumaroles—more specifically known as sulfataras—for the continuous, simple and economical extraction of salts in particular, and of any other substance similarly in solution in general, from the respective solvent carriers. It will be understood that the present invention is applicable regardless of whether the substance-containing solutions are from the sea, from lakes, or from highly mineralized springs, or are simply by-products of industry.

The above comments are applicable to both FIGS. 1 and 2, and it remains to be pointed out that in FIG. 1 a feed 24 is shown for supplying additional brine or sea water into the basin A whenever the latter needs to be refilled. A similar feed will, of course, also be provided in the basin A shown in FIG. 2. In fact, FIG. 2 is identical with FIG. 1 except for the difference in the recovery of geothermal heat.

I claim:

1. A method of extracing a solid ingredient from a solution containing a liquid solvent and having the solid ingredient dissolved therein, comprising the steps of continuously circulating a heating fluid initially through a geothermal heating station for raising the temperature of said fluid, and subsequently in heat-exchanging relationship through a body of the solution for raising the temperature of such solution to a predetermined level; removing quantities of heated solution from the body of solution and passing such quantities of heated solution through an evaporation zone; exposing each quantity of heated solution to a partial vacuum for effecting at least partial conversion of the liquid solvent into vapor and resultant precipitation of at least some of the solid ingredient; and recovering the thus precipitated solid ingredient.

2. A method as defined in claim 1, wherein the heating fluid is water which changes into steam during passage through the geothermal heating station; and further comprising the step of continuously recovering condensate from the steam and recirculating such condensate to the geothermal heating station.

3. A method as defined in claim 1, wherein the step of exposing each quantity of heated solution to a partial vacuum comprises passing each quantity through a barometric condenser as a falling column of solution.

4. A system for extracting a solid ingredient from a solution containing a liquid solvent and having the solid ingredient dissolved therein, comprising reservoir means containing a body of the solution; conduit means having a first portion located in said reservoir means immersed in the body of solution, and a second portion spaced from and communicating with said first portion and extending into a geothermal source of heat; circulating means for continuously circulating a heating fluid initially through said second portion of said conduit means for heating by the geothermal source and subsequently through said first portion for heat-exchange with the solution in said reservoir means, whereby said solution is heated; pump means for removing quantities of heated solution from said body of solution and for advancing such quantities in a predetermined path toward a downstream end of such path; and barometric condenser means adjacent a portion of such path and arranged to subject the quantity of heated solution moving in such path to the influence of a partial vacuum for effecting at least partial conversion of the liquid solvent of such quantity into vapor and resultant precipitation of at least some of the solid ingredient.

5. A system as defined in claim 4, wherein said barometric condenser means defines a substantially closed chamber surrounding said portion of said path, and wherein the pressure in said chamber is reduced rapidly in said chamber during movement of each quantity of solution therethrough whereby to produce a partial vacuum in said chamber upstream of the respective quantity of solution.

References Cited

UNITED STATES PATENTS

| | | | |
|---|---|---|---|
| 1,006,823 | 10/1911 | Block | 159—45 X |
| 1,976,936 | 10/1934 | Harms | 23—273 |
| 2,067,043 | 1/1937 | Caldwell | 159—45 |
| 3,363,664 | 1/1968 | Villanueva | 159—1 X |

OTHER REFERENCES

"Giant Still May Use Earth's Heat," Science & Mechanics, October 1951, pp. 95–97 inclusive.

WILBUR L. BASCOMB, JR., Primary Examiner

J. SOFER, Assistant Examiner

U.S. Cl. X.R.

60—26; 159—1, 32; 165—45; 202—185; 203—10, 100